United States Patent
Weissman et al.

(10) Patent No.: US 12,533,652 B2
(45) Date of Patent: Jan. 27, 2026

(54) COMPOSITION AND PROCESS FOR CAPTURING CARBON DIOXIDE

(71) Applicant: PRECISION COMBUSTION, INC., North Haven, CT (US)

(72) Inventors: Jeffrey G. Weissman, Guilford, CT (US); Codruta Maria Zoican-Loebick, North Haven, CT (US)

(73) Assignee: Precision Combustion, Inc., North Haven, CT (US)

( * ) Notice: Subject to any disclaimer, the term of this patent is extended or adjusted under 35 U.S.C. 154(b) by 1090 days.

(21) Appl. No.: 17/514,253

(22) Filed: Oct. 29, 2021

(65) Prior Publication Data

US 2022/0111350 A1 Apr. 14, 2022

Related U.S. Application Data

(60) Continuation-in-part of application No. 16/572,724, filed on Sep. 17, 2019, now abandoned, which is a
(Continued)

(51) Int. Cl.
*B01J 20/04* (2006.01)
*B01D 53/62* (2006.01)
(Continued)

(52) U.S. Cl.
CPC ............ *B01J 20/041* (2013.01); *B01D 53/62* (2013.01); *B01D 53/82* (2013.01); *B01D 53/96* (2013.01);
(Continued)

(58) Field of Classification Search
None
See application file for complete search history.

(56) References Cited

U.S. PATENT DOCUMENTS

| 5,112,793 A | 5/1992 | Magistro |
| 7,314,847 B1 | 1/2008 | Siriwardane |

(Continued)

FOREIGN PATENT DOCUMENTS

| CN | 101637725 A | 2/2010 |
| CN | 103657582 A | 3/2014 |

(Continued)

OTHER PUBLICATIONS

Machine Translation of JP-H01272336-A (Year: 1998).*
(Continued)

*Primary Examiner* — Michael Forrest
(74) *Attorney, Agent, or Firm* — Marie F. Zuckerman; Andrew D. Gathy

(57) ABSTRACT

A solid sorbent composition including calcium oxide, calcium aluminate, and a mixed metal oxide characterized by a perovskite crystalline structure, for example, lanthanum aluminate. The solid sorbent finds utility in capturing carbon dioxide from a gaseous stream containing carbon dioxide, such as emissions streams produced in combustion processes or streams derived from closed environments including airplanes, spaceships, and submarines. A reversible carbon dioxide process is disclosed involving (a) contacting a carbon dioxide-containing gaseous stream with the solid sorbent composition in a carbonator to produce a solid mixture containing calcium carbonate and a gaseous product stream reduced in carbon dioxide concentration; and (b) heating the solid mixture containing calcium carbonate in a calcinator (decarbonator) to regenerate the solid sorbent composition and produce a gaseous stream enriched in carbon dioxide.

20 Claims, 6 Drawing Sheets

Related U.S. Application Data division of application No. 14/929,723, filed on Nov. 2, 2015, now abandoned.

(60) Provisional application No. 62/093,016, filed on Dec. 17, 2014.

(51) Int. Cl.
| | | |
|---|---|---|
| *B01D 53/82* | (2006.01) | |
| *B01D 53/96* | (2006.01) | |
| *B01J 20/08* | (2006.01) | |
| *B01J 20/30* | (2006.01) | |
| *B01J 20/34* | (2006.01) | |

(52) U.S. Cl.
CPC ............ *B01J 20/08* (2013.01); *B01J 20/3078* (2013.01); *B01J 20/3085* (2013.01); *B01J 20/3483* (2013.01); B01D 2251/404 (2013.01); B01D 2253/1124 (2013.01); B01D 2257/504 (2013.01); B01D 2258/0283 (2013.01)

(56) References Cited

U.S. PATENT DOCUMENTS

| | | |
|---|---|---|
| 2007/0032380 A1 | 2/2007 | Anthony |
| 2010/0196259 A1 | 8/2010 | Garg |
| 2013/0015399 A1 | 1/2013 | Yu |
| 2014/0061551 A1 | 3/2014 | Ito |
| 2014/0072501 A1 | 3/2014 | Yu |

FOREIGN PATENT DOCUMENTS

| | | | | |
|---|---|---|---|---|
| JP | 1027336 A | 10/1998 | | |
| JP | H10272336 A | * 10/1998 | ............ | Y02A 50/20 |

OTHER PUBLICATIONS

Kierzkowska et al (CaO-Based CO2 Sorbents: From Fundamentals to the Development of New, Highly Effective Materials, ChemSusChem, vol. 6, 2013, pp. 1130-1148) (Year: 2013).*

Agnieszka M. Kierzkowska, Roberta Pacciani, and Christoph R. Müller, "CaO-Based CO2 Sorbents: From Fundamentals to the Development of New, Highly Effective Materials," ChemSusChem, vol. 6 (2013), 1130-1148.

Su F. Wu and Ming Z. Jiang, "Formation of a Ca12Al14O33 Nanolayer and Its Effect on the Attrition Behaviour of CO2-Adsorbent Microspheres Composed of CaO Nanoparticles," Ind. Eng. Chem. Res., vol. 49 (2010), 12269-12275.

R. Pacciani, C. R.Müller, J. F. Davidson, J. S. Dennis, and A. N. Hayhurst, "Synthetic Ca-Based Solid Sorbents Suitable for Capturing CO2 in a Fluidized Bed," The Canadian Journal of Chemical Engineering, vol. 86 (2008), 356-366.

Kazuhiro Mochizuki, Daisuke Hirabayashi, Yoshihiro Kojima, and Kenzi Susuki, "Evaluation of Nanoporous Aluminum Silicate Including Active Oxygen Species," Materials Transactions, vol. 46 (2005), 2629-2632.

A. Inci Isli, A. Erhan Aksoylu, and Z. Ilsen Onsan, "The Effect of Lanthanum and Barium Additives on the Thermal Stabilization of gamma-Al2O3", Turkish Journal of Chemistry, vol. 22 (1998), 253-260.

C. Dean, J. Blamey, N. H. Florin, M. J. Al-Jeboori, and P. S. Fennell, "The Calcium Looping Cycle for CO2 Capture from Power Generation, Cement Manufacture and Hydrogen Production," Chemical Engineering Research and Design, vol. 89 (2011), 836-855.

Carlos Abanades, G. Grasa, M. Alonso, N. Rodriguez, E. J. Anthony, and L. M. Romeo, "Cost Structure of a Postcombustion CO2 Capture System Using CaO," Environmental Science and Technology, vol. 41 (2007), 5523-5527.

C. S. Martavaltzi and A. A. Lemonidou, "Development of new CaO based sorbent materials for CO2 removal at high temperature," Microporous and Mesoporous Materials, 110 (2008), 119-127.

* cited by examiner

COMPOSITION AND PROCESS FOR CAPTURING CARBON DIOXIDE

CROSS-REFERENCE TO RELATED APPLICATIONS

This application is a continuation-in-part of U.S. application Ser. No. 16/572,724, filed Sep. 17, 2019, which is a divisional of U.S. application Ser. No. 14/929,723, filed Nov. 2, 2015, which claims benefit of U.S. provisional application No. 62/093,016, filed Dec. 17, 2014. The applications are incorporated in their entirety herein by reference.

FIELD OF THE INVENTION

In a first aspect, this invention pertains to a solid composition of matter, specifically, a sorbent composition capable of capturing carbon dioxide from a carbon dioxide-containing gaseous stream. In a second aspect, this invention pertains to a method of making the sorbent composition described herein. In a third aspect, this invention pertains to a process of capturing carbon dioxide from a carbon dioxide-containing gaseous stream by employing the sorbent composition of this invention. In a related aspect, this invention pertains to a reversible process employing the aforementioned sorbent composition to capture carbon dioxide from a carbon dioxide-containing gaseous stream with generation of calcium carbonate, and thereafter regenerating the sorbent composition and releasing a stream enriched in carbon dioxide for storage or industrial use.

BACKGROUND OF THE INVENTION

Power generation combustion systems, such as coal-fired power plants, are responsible for about one-third of all anthropogenic carbon dioxide emissions. Capturing carbon dioxide from power generation combustion systems presents a technically challenging problem, not least of which is an intensive energy demand. Existing power plants can be retrofit with a post-combustion process to capture carbon dioxide although such processes are currently less than optimal. One current process for capturing carbon dioxide involves contacting post-combustion flue gas emissions with a chemical solvent, such as an amine, for example monoethanolamine (MEA), which solubilizes carbon dioxide. Suitable chemical solvents tend to be expensive and suffer from several other shortcomings. Flue gases, for example, contain various sulfur oxides that can react irreversibly with amine solvents to produce non-reclaimable and corrosive salts. Additionally, hot flue gases cause amine degradation that decreases absorbent efficiency. Environmental factors associated with amine usage are also a significant consideration. Regenerating the amine solvent results in a large energy penalty, which renders the process less economically attractive. To be specific, regeneration of amine solvents using steam, generated through the power plant's main gas turbine, can use more than 4 gigajoules energy per ton of carbon dioxide (>4 GJ/ton $CO_2$).

An alternative method for capturing carbon dioxide from flue gas emissions involves use of a calcium looping cycle, which is based on high-temperature reversible carbonation of calcium oxide sorbent with carbon dioxide to form calcium carbonate, as seen in Equation 1:

$$CaO + CO_2 \leftrightarrow CaCO_3 \quad \text{Eqn. 1}$$

On an industrial scale carbon dioxide capture by calcium looping utilizes a fluidized bed technology, a mature engineering method allowing for easy processing of large volumes of flue gas. Typically, the power plant is retrofit with two fluidized bed reactors with the sorbent continuously circulated between them. One reactor comprises a carbonator wherein calcium oxide sorbent is carbonated with a carbon dioxide-containing flue gas at a temperature ranging from about 600° C. to 750° C. to produce calcium carbonate, resulting in a flue gas having a reduced concentration of carbon dioxide. The other reactor comprises a calcinator or decarbonator wherein the calcium carbonate is calcined at a temperature ranging from about 850° C. to 950° C. to regenerate the calcium oxide sorbent with production of an essentially pure stream of carbon dioxide. The calcinator is typically operated on a feed of oxygen and fuel, such as coal, to ensure that a substantially enriched stream of carbon dioxide exits the calcinator. The recovered carbon dioxide can be sequestered in an underground repository or bottled for industrial use.

The fluidized bed calcium looping technology described hereinabove provides several advantages. First, the process operates at high temperatures; therefore, a substantial portion of energy can be recuperated from hot gas and hot solid streams exiting the system to drive a steam cycle, which beneficially minimizes parasitic energy consumption. Second, the fluidized bed technology is well developed and capable of processing large volumes of flue gas. Third, calcium oxide is a cheaper and more environmentally benign sorbent as compared to amine-based solvents. Fourth, spent calcium carbonate is usable in cement industries. Fifth, calcium oxide can be used for capturing sulfur oxides; thus an efficient calcium looping process may also eliminate a need for a desulfurization unit.

On the other hand, the calcium looping technology suffers from a significant disadvantage; namely, calcium oxide quickly degrades between carbonation and decarbonation cycles. For regular limestone (CaO), conversion to carbonate decreases from 0.60 gram carbon dioxide per gram calcium oxide (0.60 g $CO_2$/g CaO) in a first cycle to a residual 0.17 g $CO_2$/g CaO in a tenth cycle, as disclosed by C. Dean, et al., Chemical Engineering Research and Design, Vol. 89, 2011, p. 836ff. The degradation is mainly a result of two factors: (a) surface area loss through sintering at the high calcination temperature, and (b) attrition of sorbent through continual circulation between the two fluidized bed reactors, the latter leading to sorbent elutriation from the system. As a consequence, deactivation of calcium oxide necessitates introducing a large make-up flow of fresh sorbent (or calcium carbonate) into the calcinator, resulting in an increasing cost and energy penalty, as the fresh sorbent must be heated to the required calcination temperature. (See J. Abanades et al., Environmental Science & Technology, Vol. 41, 2007, p. 5523ff.)

The above discussion is focused on capturing carbon dioxide from industrial emissons where carbon dioxide is present in a substantial concentration. Many applications exist, however, where it would be beneficial to remove carbon dioxide from gaseous environments containing a comparatively lower concentration of carbon dioxide. One such application involves looping a purified emissions stream, that is, after removal of most but not all of the carbon dioxide, through a secondary carbon dioxide removal process to purify the stream to even lower concentrations of carbon dioxide. Another application involves removing carbon dioxide from closed systems containing a low concentration of carbon dioxide, such as from airplane cabins, space ships, submarines and other underwater closed systems, and from building ventilation systems and other sealed terrestrial environments. In yet another application, it may be desirable to remove carbon dioxide from atmospheric air, so as to employ the captured carbon dioxide in a downstream chemical process. It should be appreciated that as the concentration of carbon dioxide decreases, the driving force to react carbon dioxide with calcium oxide also decreases, thereby rendering the removal of $CO_2$ less efficient.

The prior art as found, for example, in M. Kierzkowska, R. Paccinni, and C. R. Muller, "*CaO-Based $CO_2$ Sorbents: From Fundamentals to the Development of New, Highly Effective Materials,*" ChemSusChem, Vol. 6, 2013, pp. 1130-1148, discloses a list of individual metal oxides that can be combined with calcium oxide for capturing carbon dioxide. Among the metal oxides disclosed are individually alumina ($Al_2O_3$), calcium aluminates $Ca_9(Al_2O_6)_3$ and $Ca_{12}Al_{14}O_{33}$, zirconia ($ZrO_2$), magnesia (MgO), and lanthanum oxide ($La_2O_3$).

The use of mayenite ($Ca_{12}Al_{14}O_{33}$) in combination with calcium oxide for carbon dioxide capture is also disclosed by R. Paccinni, C. R. Muller, J. F. Davidson, J. S. Dennis, and A. N. Hayhurst, in "*Synthetic Ca-Based Solid Sorbents Suitable for Capturing $CO_2$ in a Fluidized Bed,*" The Canadian Journal of Chemical Engineering, Vol. 86, 2008, pp. 356-366; and by Su. F. Wu and Ming Z. Jiang, in "*Formation of a $Ca_{12}Al_{14}O_{33}$ Nanolayer and Its Effect on the Attrition Behavior of $CO_2$-Adsorbent Microspheres Composed of CaO Nanoparticles,*" Ind. Eng. Chem. Res., Vol. 49, 2010, pp. 12269-12275.

The art would benefit from discovery of a new solid sorbent composition capable of capturing carbon dioxide with improved sorbent capacity, with long lifetime, and with little, if any, degradation over many carbonation-decarbonation cycles, as compared with known carbon dioxide sorbents. The composition would be more desirable if it exhibited high sorbent capacity for removing carbon dioxide from a gaseous stream containing a low concentration of carbon dioxide, namely, a stream containing less than 3 volume percent, and preferably, as low as 0.04 volume percent carbon dioxide (400 parts per million, ppm, $CO_2$). Such a composition would be even more desirable if it provided sufficient attrition resistance such that the composition could be employed commercially in a calcium looping fluidized bed reactor system.

SUMMARY OF THE INVENTION

In a first aspect, this invention provides for a novel solid sorbent composition capable of capturing carbon dioxide, wherein the composition comprises calcium oxide, calcium aluminate, and a mixed metal oxide characterized by a perovskite crystalline structure.

In one advantageous embodiment, this invention provides for a novel sorbent composition capable of capturing carbon dioxide, wherein the composition comprises calcium oxide, calcium aluminate, and a mixed metal oxide characterized by a perovskite crystalline structure, the sorbent composition being prepared by a process comprising:

(a) preparing a mixture comprising calcium oxide or a precursor thereof, calcium aluminate or a precursor thereof, and a mixed metal oxide having a perovskite crystalline structure or a precursor thereof;

(b) calcining the mixture under a dry gas to form a first calcined material;

(c) contacting the first calcined material with carbon dioxide in the presence of water vapor at a first temperature sufficient to form an at least partially carbon dioxide-saturated material;

(d) decarbonating the at least partially carbon dioxide-saturated material at a second temperature sufficient to remove the carbon dioxide and form a second calcined material;

(e) cooling the second calcined material to the first temperature; and (f) repeating steps (c) through (e) at least once so as to yield the sorbent composition.

In a second aspect, this invention provides for a novel and advantageous method of synthesizing a sorbent composition capable of reversibly capturing carbon dioxide from a carbon dioxide-containing gaseous feed stream. The synthesis method comprises:

(a) preparing a mixture comprising calcium oxide or a precursor thereof, calcium aluminate or a precursor thereof, and a mixed metal oxide having a perovskite crystalline structure or a precursor thereof;

(b) calcining the mixture under a dry gas to form a first calcined material;

(c) contacting the first calcined material with carbon dioxide in the presence of water vapor at a first temperature sufficient to form an at least partially carbon dioxide-saturated material;

(d) decarbonating the at least partially carbon dioxide-saturated material at a second temperature sufficient to remove the carbon dioxide and form a second calcined material;

(e) cooling the second calcined material to the first temperature; and (f) repeating steps (c) through (e) at least once so as to yield the sorbent composition.

In a third aspect, this invention provides for a novel process of capturing carbon dioxide from a carbon dioxide-containing gaseous stream. The process comprises contacting a gaseous feed stream comprising carbon dioxide with a sorbent composition comprising calcium oxide, calcium aluminate, and a mixed metal oxide characterized by a perovskite crystalline structure, the sorbent composition being prepared by the process described hereinabove, and as described in greater detail hereinafter. The contacting of the gaseous feed stream with the sorbent composition is conducted under carbonation process conditions sufficient to produce a solid mixture comprising calcium carbonate and a gaseous product stream of reduced carbon dioxide concentration, as compared with an initial carbon dioxide concentration of the gaseous feed stream.

In a fourth aspect, this invention provides for a novel reversible process of capturing and recovering carbon dioxide from a carbon dioxide-containing gaseous stream. This process comprises:

(a) in a carbonation reactor, contacting a gaseous feed stream comprising carbon dioxide with a sorbent composition comprising calcium oxide, calcium aluminate, and a mixed metal oxide characterized by a perovskite crystalline structure, the sorbent composition prepared by the process described hereinabove and in greater detail hereinafter; the contacting occurring under carbonation process conditions sufficient to produce a solid mixture comprising calcium carbonate and a gaseous product stream comprising a reduced concentration of carbon dioxide, as compared with an initial carbon dioxide concentration of the gaseous feed stream; and (b) in a calcination reactor, heating the solid mixture comprising calcium carbonate under decarbonation process conditions sufficient to regenerate the sorbent composition comprising calcium oxide, calcium aluminate, and the mixed metal oxide having the perovskite crystalline structure, thereby producing a gaseous stream enriched in carbon dioxide.

As compared with prior art compositions, the sorbent composition of this invention is capable of capturing carbon dioxide from a carbon dioxide-containing gaseous feed stream, such as an industrial flue gas, with improved sorbent capacity. More specifically, the composition of this invention provides an acceptable sorbent capacity with gaseous streams containing a wide range of carbon dioxide concentrations, from as low as 0.04 percent to 100 percent, by volume, while maintaining an acceptable calcium oxide conversion to calcium carbonate. It should be appreciated that the composition of this invention advantageously retains its sorbent capacity over multiple carbonation-decarbonation cycles at temperatures in excess of 900° C. Unexpectedly, when the sorbent is prepared in accordance with the advantageous method of making described herein, the sorbent of this invention exhibits increased $CO_2$ capacity with advancing carbonation cycles, as measured by grams carbon dioxide adsorbed per gram sorbent. As an added benefit, the composition of this invention can be employed in a fluidized bed technology for processing large volumes of flue gas or other carbon dioxide-containing gaseous streams applicable to an industrial scale.

It should be further appreciated that the solid sorbent composition of this invention advantageously tolerates certain flue gas contaminants that otherwise cause problems for prior art amine sorbents. In this regard, calcium oxide, a component of the composition of this invention, is known to be a useful sorbent for sulfur oxides present in flue gases. Moreover, whereas capturing carbon dioxide with an amine sorbent has a parasitic demand of about 12 percent energy efficiency; in contrast, the process of this invention utilizing the novel sorbent composition described herein can be thermally integrated to produce steam, thereby lowering the parasitic demand to a penalty of less than 5 percent energy efficiency. Furthermore, the calcium oxide looping process of this invention offers a potential cost reduction of about 50 percent versus prior art calcium oxide looping technologies and about 70 percent versus prior art amine technologies.

DRAWINGS

Figure 3:
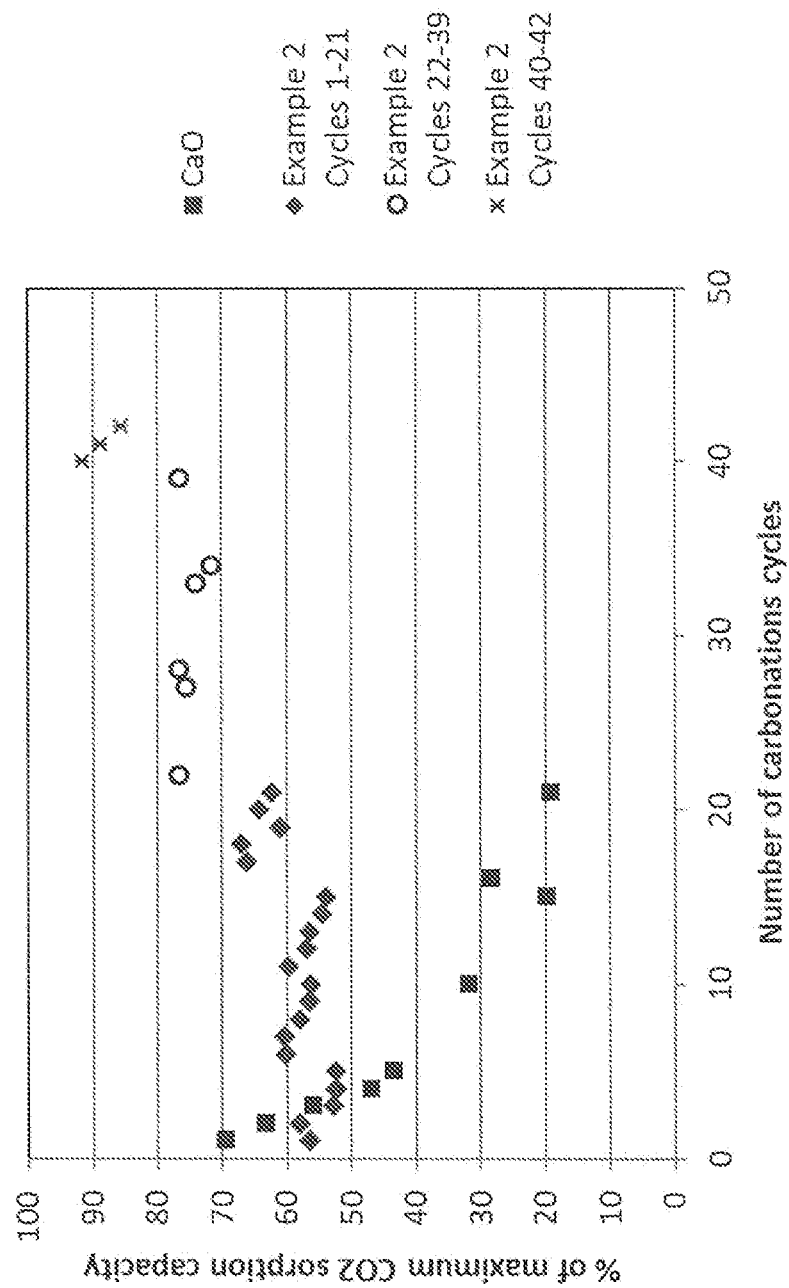

FIG. 3 presents a graph plotting percent of maximum $CO_2$ sorption capacity as a function of number of carbonation cycles for embodiments of the solid sorbent composition and process of this invention. For comparative purposes the graph illustrates the maximum $CO_2$ sorption capacity as a function of carbonation cycles for a prior art calcium oxide sorbent.

Figure 4:
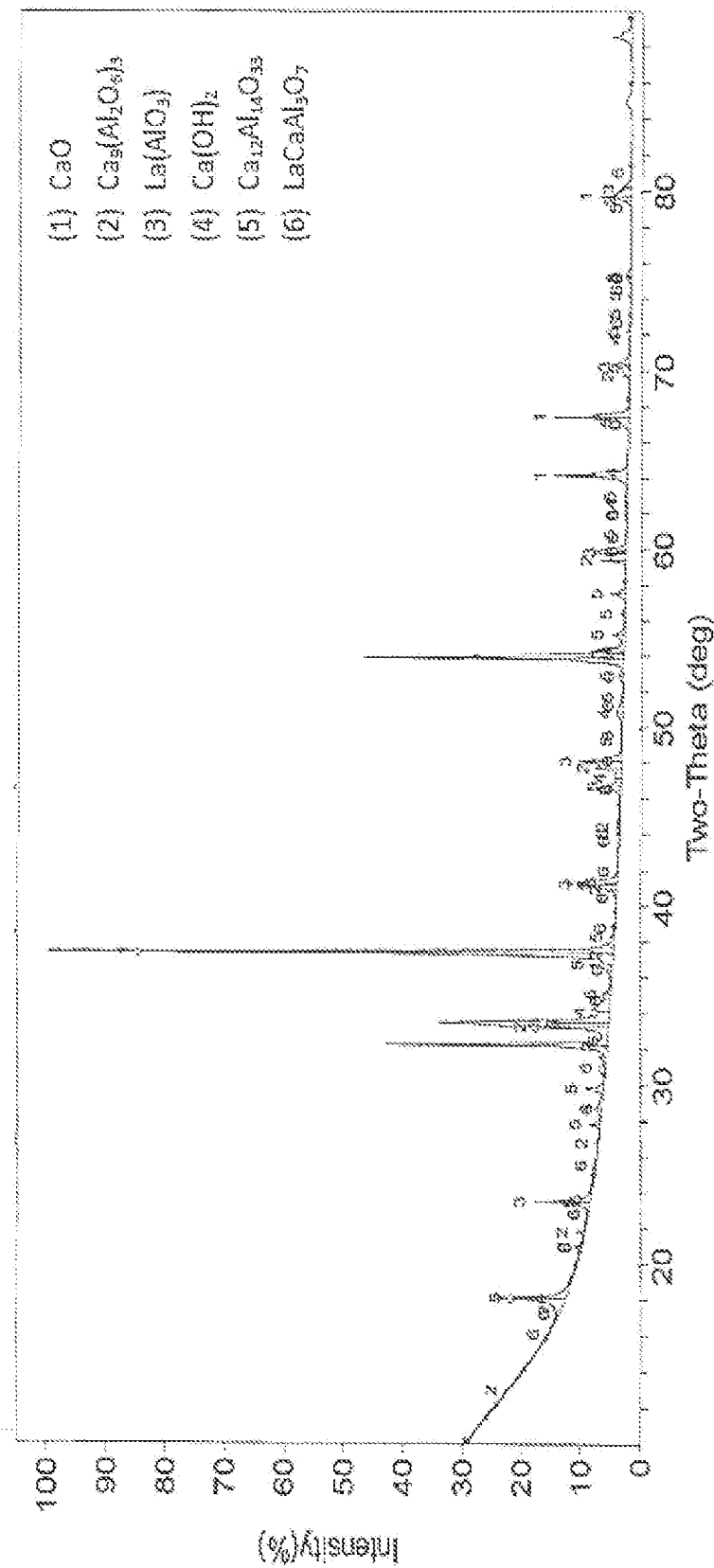

FIG. 4 presents an XRD pattern of an embodiment of the solid sorbent composition of this invention after cycling through 15 carbonation and decarbonation cycles, ending on a decarbonation cycle.

Figure 5:
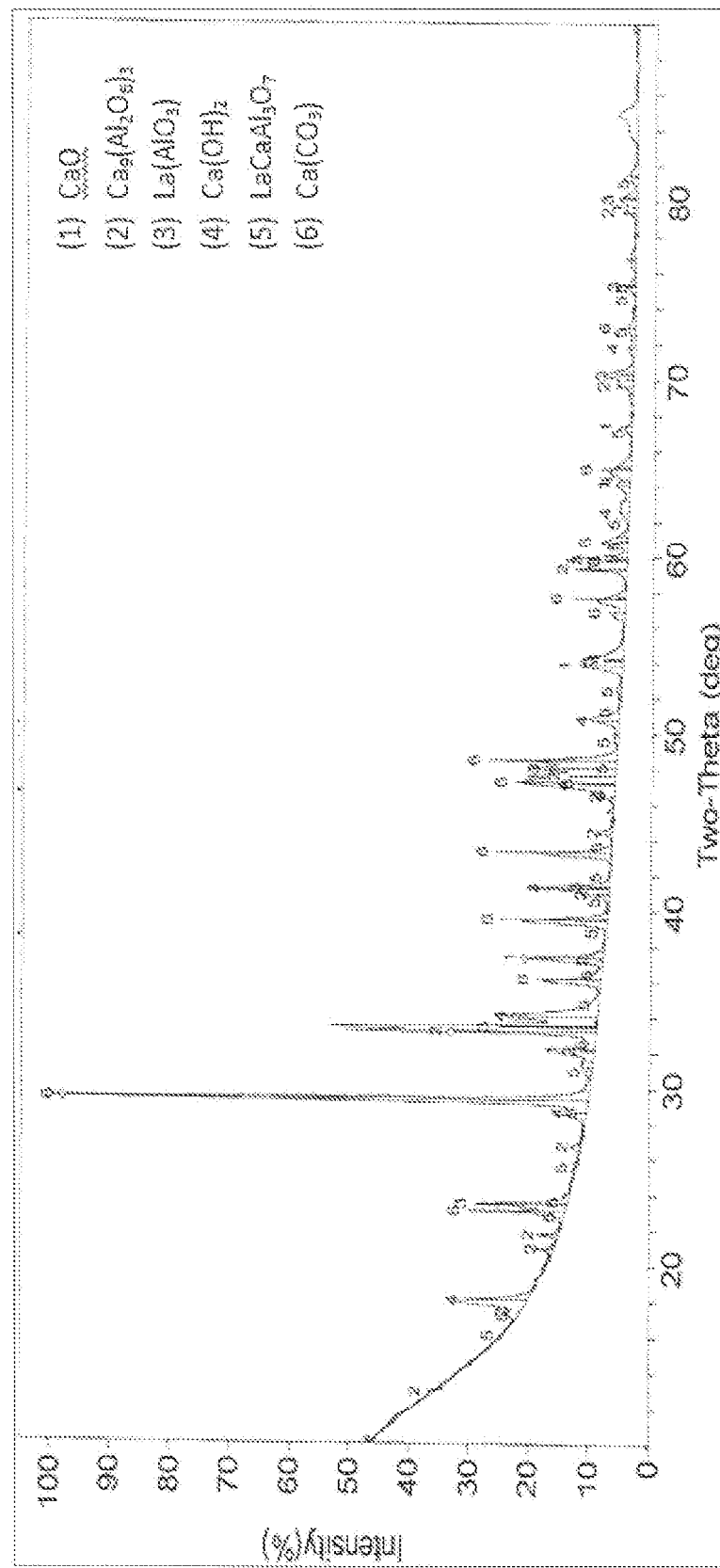

FIG. 5 presents an XRD pattern of an embodiment of the solid sorbent composition of this invention after cycling through 42 carbonation and decarbonation cycles, ending on a carbonation cycle.

Figure 6:
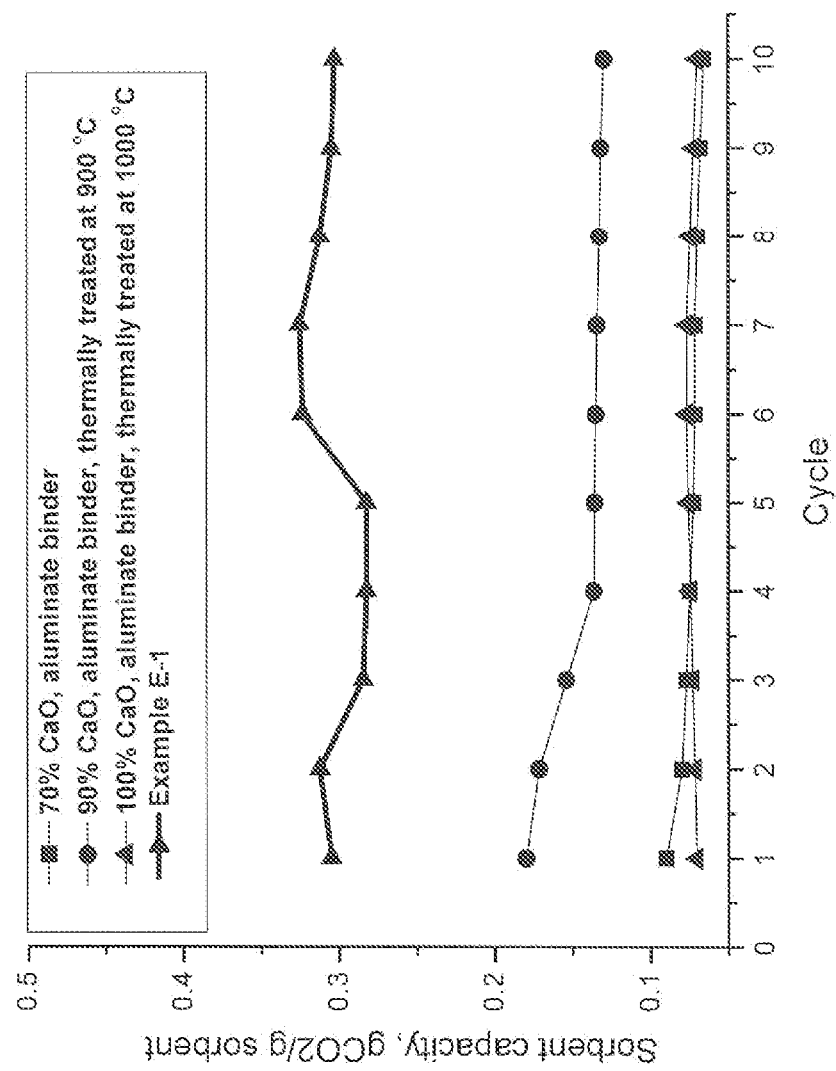

FIG. 6 presents a graph plotting $CO_2$ sorbent capacity as a function of number of carbonation cycles for an embodiment of the solid sorbent composition and process of this invention, as compared with several prior art sorbent samples.

DETAILED DESCRIPTION OF THE INVENTION

In one more advantageous embodiment this invention provides for a novel solid sorbent composition comprising calcium oxide, calcium aluminate, and lanthanum aluminante characterized by a perovskite crystalline structure, the sorbent being prepared by a process comprising:
(a) preparing a mixture comprising calcium oxide or a precursor thereof, calcium aluminate or a precursor thereof, and lanthanum aluminate having a perovskite crystalline structure or a precursor thereof;
(b) calcining the mixture under a dry gas to form a first calcined material;
(c) contacting the first calcined material with carbon dioxide in the presence of water vapor at a first temperature sufficient to form an at least partially carbon dioxide-saturated material;
(d) decarbonating the at least partially carbon dioxide-saturated material at a second temperature sufficient to remove the carbon dioxide and form a second calcined material;
(e) cooling the second calcined material to the first temperature; and
(f) repeating steps (c) through (e) at least once so as to yield the sorbent composition.

In another more advantageous embodiment, this invention provides for a method of synthesizing a solid sorbent composition capable of reversibly capturing carbon dioxide from a carbon dioxide-containing gaseous stream. The synthesis method comprises:
(a) preparing a mixture comprising calcium oxide or a precursor thereof, calcium aluminate or a precursor thereof, and lanthanum aluminate having a perovskite crystalline structure or a precursor thereof;
(b) calcining the mixture under a dry gas to form a first calcined material;
(c) contacting the first calcined material with carbon dioxide in the presence of water vapor and at a first temperature sufficient to form an at least partially carbon dioxide-saturated material;
(d) decarbonating the at least partially carbon dioxide-saturated material at a second temperature sufficient to remove the carbon dioxide and form a second calcined material;
(e) cooling the second calcined material to the first temperature; and
(f) repeating steps (c) through (e) at least once so as to yield the sorbent composition.

In yet another more advantageous embodiment, this invention provides for a process of capturing carbon dioxide from a carbon dioxide-containing gaseous stream. The process comprises contacting a gaseous feed stream comprising carbon dioxide with a solid sorbent composition comprising calcium oxide, calcium aluminate, and lanthanum aluminate having a perovskite crystalline structure, the sorbent composition being prepared by the process described herein. The contacting of the gaseous stream with the solid sorbent composition is conducted under carbonation process conditions sufficient to produce a solid mixture comprising calcium carbonate and a gaseous product stream having a reduced carbon dioxide concentration, as compared with an initial carbon dioxide concentration of the gaseous feed stream.

In yet another more advantageous embodiment, this invention provides for a novel reversible process of capturing and recovering carbon dioxide from a carbon dioxide-containing gaseous stream. This process comprises:

(a) in a first fluidized bed comprising a carbonation reactor, contacting a gaseous feed stream comprising carbon dioxide with a solid sorbent composition comprising calcium oxide, calcium aluminate, and lanthanum aluminate having a perovskite crystalline structure, the sorbent composition being prepared by the process described herein; the contacting occurring under carbonation process conditions sufficient to produce a solid mixture comprising calcium carbonate and a gaseous product stream comprising a reduced concentration of carbon dioxide, as compared with an initial carbon dioxide concentration of the gaseous feed stream; and (b) in a second fluidized bed comprising a calcination reactor, heating the solid mixture comprising calcium carbonate under decarbonation process conditions sufficient to regenerate the solid sorbent composition comprising calcium oxide, calcium aluminate, and lanthanum aluminate having the perovskite crystalline structure, thereby producing a gaseous stream enriched in carbon dioxide. As used herein, the term "fluidized bed" embraces sorbent beds having a wide range of hydrodynamic lift, including but not limited to lifted beds, ebullated beds, and moving beds.

In one application, the novel sorbent composition finds utility in capturing carbon dioxide from a flue gas stream obtained from the combustion of coal or other carbon-bearing fuels. In this regard, the composition of this invention provides for reducing anthropogenic emissions of carbon dioxide an unwanted greenhouse gas contributing to global warming. In another application, the composition of this invention is capable of removing carbon dioxide from gaseous environments containing a low concentration of carbon dioxide, namely, those having a $CO_2$ concentration as low as about 0.04 volume percent. One such application involves looping a purified emissions stream, after a first-pass removal of most but not all of the carbon dioxide, through the process of this invention for a second time so as to purify the stream to even lower concentrations of carbon dioxide. Another application involves removing carbon dioxide from the atmosphere of closed systems, such as from the atmosphere of airplane cabins, spaceships, submarines, building ventilation systems, and any other sealed environment. In yet another application, the composition finds utility in capturing carbon dioxide from atmospheric air for downstream use, for example, in chemical processes requiring carbon dioxide as a reactant or solvent. The novel sorbent composition further finds utility in releasing captured carbon dioxide on demand under calcination conditions, so as to produce a stream enriched in carbon dioxide that can be permanently sequestered or bottled for industrial use.

In one embodiment, the solid sorbent composition comprises calcium oxide, calcium aluminate selected from the group consisting of crystalline structures of molecular formula $Ca_9(Al_2O_6)_3$ (nonacalcium tris(dialuminate)), $CaAl_4O_7$ (grossite), $CaAl_2O_4$ (dmitryivanovite), and $Ca_{12}Al_{14}O_{32}Y$ (mayenite), wherein Y is selected from the group consisting of $O^{2-}$, $N^{2-}$, $(OH^-)_2$, $(F^-)_2$, $(Cl^-)_2$, $(H_2O)_4(Cl^-)_2$, $(H_2O)_4(F^-)_2$, and $(e^-)_2$ where $e^-$ represents a free electron, and mixtures thereof; and further comprises a mixed metal oxide characterized by a perovskite crystalline structure of formula $ABX_3$, wherein A is a divalent cation of Group IIA and B is a tetravalent cation of Group IVA; or alternatively, A is a trivalent cation selected from the group consisting of Group IIIA and the lanthanide rare earths, and B is a trivalent cation of Group IIIB; and X represents divalent oxide ($O^{2-}$). In one embodiment, the mixed metal oxide $ABX_3$ is lanthanum aluminate ($LaAlO_3$).

The solid sorbent composition of this invention requires calcium oxide. Commonly known as "quicklime", calcium oxide is a white, alkaline, crystalline solid of molecular formula CaO and molecular weight 56.08 g/mol. It readily reacts with carbon dioxide ($CO_2$) at temperatures above 500° C., as illustrated in Eqn. 1 hereinabove, to form calcium carbonate ($CaCO_3$), otherwise known as "calcite" or sometimes "aragonite" or "vaterite". Under calcination conditions, the carbonate is reversibly converted back to calcium oxide (CaO) with release of $CO_2$. Alternatively, each of the calcium oxide and calcium carbonate can be independently present as a compositionally equivalent amorphous (non-crystalline) phase rather than a crystalline phase. Likewise, a mixture of crystalline and non-crystalline phases can be present. The calcium oxide and calcium carbonate are not limited to the aforementioned phases; other crystalline and/or non-crystalline phases not specifically mentioned herein can be suitably employed. In addition, in one embodiment the calcium oxide is present in the composition of this invention in a hydrated form, as hydrated calcium oxide of molecular formula $Ca(OH)_2$, known as "portlandite". Additionally, mixtures of anhydrous calcium oxide (CaO) and hydrated calcium oxide ($Ca(OH)_2$) are suitably employed in the composition of this invention.

In its decarbonated form, the solid sorbent composition of this invention comprises greater than about 18 percent, and in one embodiment, greater than about 30 percent, and in another embodiment greater than about 50 percent calcium oxide (dried basis) by weight, based on the total weight of the sorbent composition. In its decarbonated form, the solid sorbent composition of this invention comprises less than about 90 percent, and preferably, less than about 80 percent calcium oxide (dried basis) by weight, based on the total weight of the composition.

Calcium aluminate is another required component of the solid sorbent composition of this invention. In one embodiment, the calcium aluminate is present in a mayenite crystalline structure having a molecular formula expressed as $Ca_{12}Al_{14}O_{32}Y$, wherein Y is selected from the group consisting of $O^{2-}$, $N^{2-}$, $(OH^-)_2$, $(F^-)_2$, $(Cl^-)_2$, $(H_2O)_4(Cl^-)_2$, $(H_2O)_4(F^-)_2$, and $(e^-)_2$ where $e^-$ represents a free electron. In another embodiment, the calcium aluminate is present in a nonacalcium tris(dialuminate) crystalline structure having a molecular formula expressed as $Ca_9(Al_2O_6)_3$. Other crystalline calcium aluminates suitable for this invention include, without limitation, grossite represented by molecular formula $CaAl_4O_7$ and dmitryivanovite (krotite) represented by molecular formula $CaAl_2O_4$. Other crystalline phases of calcium aluminate not specifically mentioned herein may also be suitably employed. The identification of crystalline calcium aluminates can be made by any conventional analytical technique including X-ray diffraction (XRD), electron diffraction, and Raman spectroscopy, as applicable. Generally, XRD is preferred. A suitable reference for XRD patterns of the aforementioned crystalline materials is found, for example, on-line at http://RRUFF.info.

Alternatively, the calcium aluminate is present as a compositionally equivalent amorphous (non-crystalline) phase, rather than a crystalline phase. Likewise, in one embodiment a mixture of crystalline and non-crystalline phases of calcium aluminate are present. The calcium aluminate is not limited to the aforementioned phases; other crystalline and/or non-crystalline phases not specifically mentioned herein can be suitably employed.

The amounts of the various forms of calcium aluminate can vary as a function of specific process conditions during synthesis of the composition, as a function of specific carbonation and decarbonation conditions, and as a function of time of use on stream. It is possible to synthesize the composition with the calcium aluminate essentially exclusively in the $Ca_9(Al_2O_6)_3$ crystalline form. Mayenite may begin to form under calcination or decarbonation conditions. Mayenite may form and then disappear with time on stream. Other crystalline and/or non-crystalline phases of calcium aluminate, including mixtures thereof, may be present in the freshly synthesized composition or any of the used compositions.

In its decarbonated form, the solid sorbent composition of this invention comprises greater than about 5 percent, and preferably, greater than about 15 percent calcium aluminate by weight, based on the total weight of the composition. In its decarbonated form, the composition of this invention comprises less than about 80 percent, and in one embodiment, less than about 60 percent calcium aluminate by weight, based on the total weight of the composition.

The mixed metal oxide characterized by the perovskite structure is the third required component of the solid sorbent composition of this invention. As the component of lowest weight percentage, the mixed metal oxide may be considered an additive, or depending on how low its concentration, a dopant. In its decarbonated form the composition of this invention comprises greater than about 2 percent, preferably, greater than about 5 percent mixed metal oxide of perovskite structure by weight, based on the total weight of the composition. In its decarbonated form the composition of this invention comprises less than about 20 percent, preferably, less than about 15 percent mixed metal oxide by weight, based on the total weight of the composition.

The perovskite crystalline structure is represented by the general formula $ABX_3$, wherein A and B are cations of different sizes, A being larger than B; and X is an anion that bonds to both cations. An ideal cubic symmetry has the B cation in 6-fold coordination surrounded by an octahedron of X anions. Ideally, the A cation has a 12-fold cuboctahedral coordination. The X anions typically occupy face centers. Distortions and buckling as a result of differing cation sizes can lower the symmetry, for example, to orthorhombic, tetragonal, or trigonal.

In one preferred embodiment of this invention, A is a divalent cation selected from Group IIA of the Periodic Table, which is paired with a tetravalent cation B ion selected from Group IVA. "X" represents divalent oxide ($O^{2-}$). The Group IIA cations include divalent metal ions selected from the group consisting of beryllium, magnesium, calcium, strontium, barium, and mixtures thereof. Preferably, the Group IIA cation is strontium or barium or a mixture thereof. The Group IVA cations include the tetravalent ions selected from the group consisting of titanium, zirconium, and mixtures thereof, preferably, titanium. In another preferred embodiment, A is a trivalent cation selected from Group IIIA or the lanthanide rare earths, which is paired with a trivalent B cation selected from Group IIIB. Again, X represents divalent oxide ($O^{2-}$). The Group IIIA ions include trivalent scandium, yttrium, and mixtures thereof the lanthanide rare earth ions include the trivalent ions of lanthanum, gadolinium, ytterbium, and mixtures thereof. The Group IIIB cations include trivalent aluminum. Among more preferred perovskites are the following embodiments: lanthanum aluminate ($LaAlO_3$), barium titanate ($BaTiO_3$), strontium titanate ($SrTiO_3$), and mixtures thereof. In one preferred embodiment, the mixed metal oxide having the perovskite structure is lanthanum aluminate ($LaAlO_3$).

The perovskite crystalline phase may be present in conjunction with one or more non-crystalline (amorphous or glassy) phases of a compositionally equivalent mixed metal oxide.

One method of synthesizing the solid sorbent composition of this invention involves preparing a slurry comprising a liquid diluent, calcium oxide or a precursor thereof, calcium aluminate or a precursor thereof, and the mixed metal oxide characterized by the perovskite crystalline structure or a precursor thereof. Thereafter, the slurry is milled for a period of time. Milling involves mixing, tumbling, rolling, or otherwise agitating the slurry in the presence of a milling media that facilitates formation of small particles and intimate mixing of all slurry components. After milling, the slurry is dried to remove the liquid diluent and then heated under calcination conditions including under a dry gas sufficient to produce a first calcined material, which in one embodiment functions as the sorbent for capturing carbon dioxide.

In an alternative synthesis, the liquid diluent is eliminated from the aforementioned preparation; and a solid mixture is prepared comprising the solids only: calcium oxide or a precursor thereof, calcium aluminate or a precursor thereof, and the mixed metal oxide having the perovskite crystalline structure or a precursor thereof. In this embodiment the solid mixture is milled for a time in the absence of liquid diluent and then heated under calcination conditions including under a dry gas sufficient to produce the a first calcined material.

Calcium oxide in hydrated ($Ca(OH)_2$) and non-hydrated forms (CaO) can be used in the synthesis mixture. Calcium carbonate, calcium nitrate, or a mixture thereof can be suitably employed, as non-limiting examples of the precursor to calcium oxide. In one embodiment, the precursor to calcium aluminate comprises a mixture of calcium oxide (anhydrous or hydrated) combined with alumina or a hydrated form of alumina. Other suitable precursors to the calcium aluminate include, without limitation, hydrotalcite of molecular formula $CaAl_2(CO_3)_2(OH)_4 \cdot 3H_2O$ and hydrocalumite of molecular formula $Ca_4Al_2(OH)_{12}$ (Cl, OH)$_2 \cdot 4H_2O$ or formula $Ca_4Al_2(OH)_{12}$ ($CO_3$)$\cdot 4H_2O$. Mixtures of any of the aforementioned materials can be employed as precursors to the calcium aluminate. Among the precursors to the mixed metal oxide having the perovskite crystalline structure, we find that the oxides, hydroxides, and salts of the relevant mixed metal components can be used. Among suitable salts are included, without limitation, the corresponding metal nitrates, metal sulfates, metal halides, and metal carboxylates, such as the metal acetates and metal oxylates. Preferably, the salt is a combination of mixed metal nitrates. Accordingly, in preparing the Group IIA mixed metal titanate, it is acceptable to use a precursor mixture comprising, for example, barium oxide, strontium oxide, barium nitrate, and/or strontium nitrate in combination with titania. In preparing the Group IIIA or lanthanide rare earth aluminate, it is acceptable to use a precursor mixture, for example, comprising lanthanum nitrate, yttrium nitrate, and/or scandium nitrate in combination with alumina or a hydrated form of alumina. In one embodiment, a mixture of lanthanum nitrate and alumina is employed as the precursor to lanthanum aluminate.

The relative quantities of compounds or precursors used in preparing the slurry or solid mixture are calculated based on weight percentages of calcium oxide, calcium aluminate, and mixed metal oxide of perovskite structure desired in the final sorbent composition. One skilled in the art will know how to calculate the slurry composition based upon the desired end product. For acceptable results, the slurry comprises from about 10 to about 50 percent solids, the balance being a liquid diluent capable of ready volatilization at a temperature between about 50° C. and 150° C. Acceptable diluents include water (preferably deionized), $C_{1-4}$ alcohols, and mixtures of water and $C_{1-4}$ alcohols. Milling is accomplished in air, typically at room temperature and ambient pressure for at least 1 hour, preferably, from about 4 to about 24 hours. The milling process itself involves tumbling, rotating, or otherwise agitating the slurry in the presence of a milling media, which typically comprises a collection of ceramic particles in the form of beads, spheres, cylinders, or any other suitable shape. Milling provides intimate contact between the slurry components by reducing particle sizes and by increasing surface area available for carbon dioxide capture.

After milling, the slurry is separated from any milling material by any suitable method, for example, decanting, sieving, siphoning, or vacuuming; and then the recovered slurry is dried at a temperature sufficient to evaporate greater than about 70 percent, preferably, greater than about 90 percent of the liquid diluent. The drying can be conducted using conventional drying techniques, such as in a conventional oven, or by spray drying, or by spray atomization into a hot gas. Afterwards, the dried slurry material is calcined at a temperature generally in excess of 800° C., and preferably greater than about 800° C. and less than about 1400° C., under a dry gas, for example, air, nitrogen, oxygen, helium, or argon, for a time sufficient to obtain the first calcined material. As used in this context, the term "dry" refers to a concentration of water vapor of less than 1 volume percent, based on a total volume of the dry gas. Preferably, the dried slurry is calcined for at least 1 hour. If desired, the dried slurry can be fed to a fluidized bed calcinator and calcined therein.

In a particularly advantageous embodiment of making the sorbent, the first calcined material is carbonated by contact with a stream containing carbon dioxide in the presence of water vapor at a first temperature. The $CO_2$-containing stream typically contains from about 400 parts per million to about 90 percent by volume carbon dioxide and from about 1 to about 25 percent by volume water vapor. Any balance can be satisfied by nitrogen or non-reactive gas, such as argon or helium. Carbonation is conducted at a temperature typically greater than about 500° C., and preferably, greater than about 650° C. Carbonation is conducted at a temperature typically less than about 750° C., preferably, less than about 725° C.

Thereafter in this advantageous embodiment of making, the carbonated material is decarbonated at a second temperature sufficient to form a second calcined material. In one embodiment, a sweep stream is passed through the carbonated material during decarbonation. The sweep stream comprises any dry gas exemplified, for example, by nitrogen, air, or inert gas, such as helium or argon, wherein in this context the term "dry" refers to a water vapor concentration of less than 1 volume percent, based on the total volume of the sweep stream. The decarbonation temperature (herein, the "second temperature") typically is greater than about 850° C., and preferably, greater than about 880° C., but typically is less than about 1,400° C., and preferably, less than about 1,100° C.

Finally, in this advantageous embodiment of making the sorbent, the decarbonated material is cooled to the first temperature, that is the temperature employed for carbonation described hereinabove; and the material is thereafter cycled through carbonation in the presence of water and decarbonation at least one more time, for a total number of carbonation-decarbonation cycles of at least two times, so as to produce the sorbent composition of this invention. Typically, the total number of carbonation-decarbonation cycles during synthesis is less than about 8 times.

The process of this invention of removing carbon dioxide from a $CO_2$-containing gaseous feed stream is conducted in any suitable reactor, such as a fixed bed or fluidized bed reactor, provided that the reactor's materials of construction withstand carbonation (adsorption) process conditions. In some embodiments, a fluidized bed reactor is preferred, especially when a decarbonation step is to be employed to recover the solid sorbent. Generally, the carbon dioxide-containing gaseous stream is contacted with the bed containing the solid sorbent under carbonation process conditions sufficient to capture carbon dioxide per the forward reaction of Equation 1 hereinabove to produce calcium carbonate. The carbon dioxide-containing gaseous feed stream fed to the reactor generally comprises carbon dioxide in a concentration ranging from about 0.04 volume percent up to 100 volume percent. Such streams include air streams (0.04 vol. % $CO_2$) as well as emissions streams from combustion processes, such as flue gas streams emanating from coal power plants, wherein the carbon dioxide concentration typically ranges from about 15 to about 20 volume percent. Other streams accommodated by the carbonation process include atmospheric air, gas streams from air ventilation systems, gas streams from closed environments, such as airplanes, spaceships, submarines, and any other sealed enclosure.

Carbonation is typically conducted at a temperature greater than about 500° C., and preferably, greater than about 650° C. Carbonation is typically conducted at a temperature less than about 750° C., preferably, less than about 725° C. Since the carbonation reaction is an equilibrium process, as illustrated in Equation 1 hereinabove, for practical purposes the rate of carbonation is typically too slow below a temperature of about 500° C. Above about 750° C., the rate of decomposition of the carbonate begins to accelerate. The flow rate of the carbon dioxide-containing gaseous feed stream through the carbonator can vary as known to the person skilled in the art. The gaseous stream exiting from the carbonation process comprises a reduced concentration of carbon dioxide, as compared with the initial carbon dioxide concentration of the gaseous feed stream fed to the carbonator. Typically, from about 50 percent to about 95 percent of the carbon dioxide is removed from the gas feed stream depending upon the inlet stream $CO_2$ concentration, the flow rate of the inlet stream, the quantity of sorbent, and temperature, amongst other factors.

The carbonation reactor has been described hereinabove and in FIG. 1 as a single reactor; however, another embodiment would employ a plurality of carbonation reactors, including two, three, or more carbonation reactors, connected in series. In this embodiment, the reactors are connected via a conduit or flow path, such that the decarbonated gaseous stream exiting one reactor is fed into the next reactor. The purpose of such a design is to conduct the decarbonation in a series of reactors operating at decreasing temperatures, so as to push the equilibrium reaction (Eqn. 1) to increasing yields of calcium carbonate and thus a decreasing concentration of carbon dioxide in sequential decarbonated gaseous streams. As an example, a three-stage decarbonator can be envisioned with the first decarbonator operating at 750° C.; a second decarbonator operating at 600° C., and a third decarbonator operating at 500° C. or similar arrangement. It should be appreciated that each decarbonated gas stream exiting one of the decarbonators can be passed through a heat exchanger to reduce its temperature to that temperature appropriate for the next stage in the series, or for the final stage as desired for downstream purposes.

In a commercial process the captured carbon dioxide should be recovered so as to regenerate the sorbent for reuse in the carbonator. Recovery includes decarbonation and sequestration of the carbon dioxide. Sequestration involves storing the recovered carbon dioxide in an underground cave or storage facility, or alternatively, compressing and storing the recovered carbon dioxide in pressurized vessels for commercial use. The decarbonation process is conducted in any suitable reactor, such as a fixed bed or fluidized bed calcinator, constructed from materials capable of withstanding the high temperature of the decarbonation conditions. A fluidized bed reactor is preferred, especially when the decarbonation step is coupled with a carbonation step.

Generally, the partially or fully loaded solid sorbent having carbon dioxide incorporated therein as calcium carbonate is decarbonated in a manner similar to that employed for the decarbonation step of the sorbent synthesis method. Accordingly, the decarbonation is effected at a temperature greater than about 850° C., preferably, greater than about 880° C. Decarbonation is typically conducted at a temperature less than about 1,400° C., preferably, less than about 1,100° C. In one embodiment, a sweep gas is passed over the sorbent during decarbonation; such sweep gases typically selected from the group consisting of nitrogen, helium, steam, and carbon dioxide. The sweep gas should be "dry", and therefore contain not more than about 1 volume percent water. If a fluidized bed is used, the flow rate of the sorbent comprising calcium carbonate through the calcinator (decarbonator) can vary as known to the person skilled in the art. The gaseous stream exiting the calcinator comprises from about 95 to about 99 percent carbon dioxide, by volume; and for purposes of this invention is therefore deemed to be "enriched" in carbon dioxide.

The calcinator is preferably fired with a mixture of fuel, such as methane, natural gas, or coal, and an oxidant, suitably air or oxygen, under combustion conditions.

Figure 1:
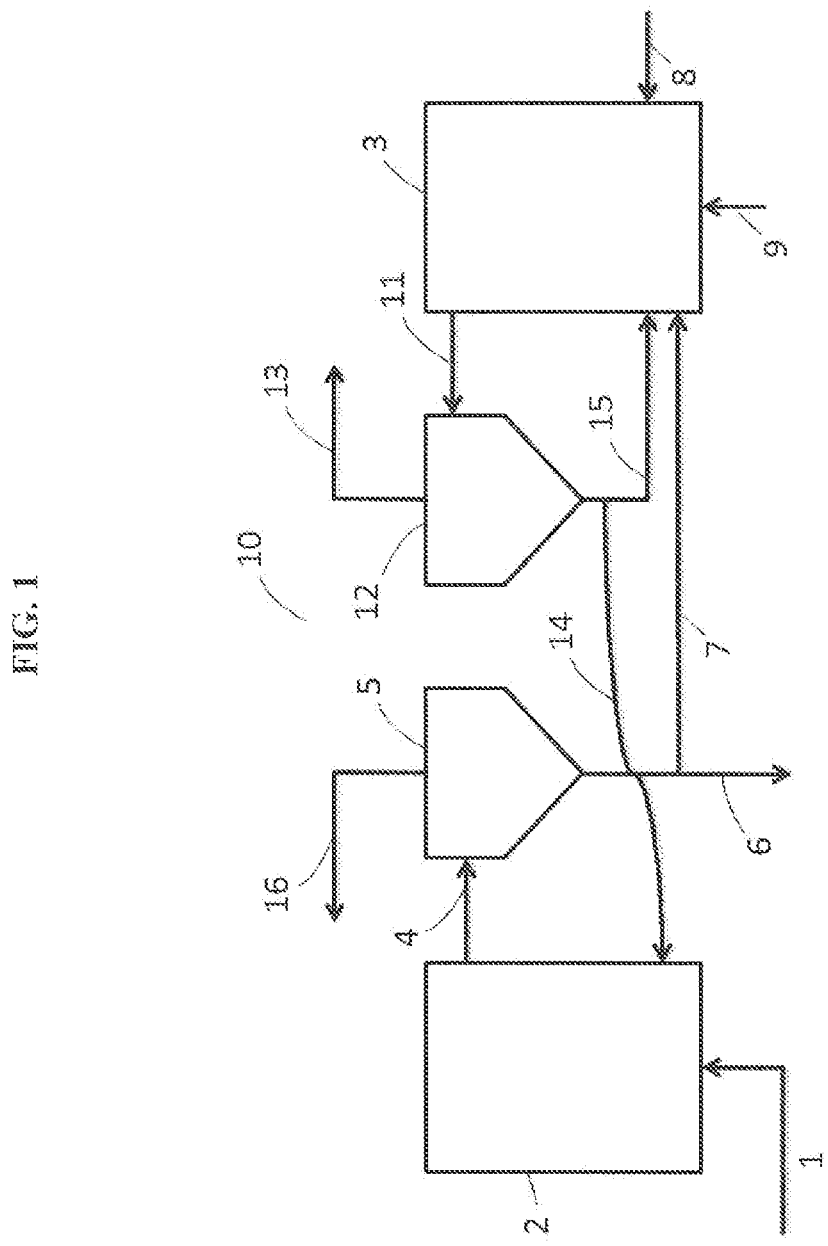
FIG. 1 illustrates a flow chart of a process of capturing carbon dioxide utilizing a fluidized bed carbonator and a fluidized bed calcinator (decarbonator). The process can be employed with the sorbent composition of this invention.

FIG. 1 illustrates a reversible calcium looping process in a dual fluidized bed reactor system 10 adapted to utilizing the carbon dioxide sorbent composition of this invention. A carbon dioxide-containing gaseous stream 1 is fed into the first fluidized bed reactor 2 (carbonator), wherein the stream is contacted with the sorbent comprising calcium oxide, calcium aluminate, and the mixed metal oxide characterized by a perovskite crystalline structure, at a temperature greater than about 500° C. and less than about 750° C. A mixed phase stream 4 (gas/solid) exits carbonator 2 and is transferred to separator 5, from which a decarbonated gaseous stream 16 is recovered. Also recovered from carbonator 2 is solid stream 6/7, a solid mixture comprising calcium carbonate. Solid stream 7 feeds into second fluidized bed 3 (calcinator or decarbonator), whereas solid stream 6 provides a stream for downstream disposal or utilization. Second fluidized bed 3 receives the solid calcium carbonate stream 7, fuel 8 (e.g., coal), and oxidant 9, such as air or oxygen, such that the calcium carbonate is calcined at a temperature ranging from greater than about 850° C. to less than about 1,400° C., so as to regenerate the sorbent composition of this invention. A mixed phase stream 11 (gas/solid) exiting calcinator 3 is fed into second separator 12. The regenerated sorbent exits separator 12 via stream 14 and is recycled to the carbonator 2. A portion of regenerated solid sorbent can be recycled from second separator 12 to decarbonator 3 via line 15. Also exiting second separator 12 is a carbon dioxide-enriched gaseous stream 13 comprising from about 95 to 99 volume percent $CO_2$ (excluding water from combustion of fuel feed 8) which is directed to a downstream sequestration unit or utilization method.

The solid sorbent composition of this invention can be cycled through greater than about 40 carbonation and decarbonation cycles with little degradation. Essentially no morphological changes are observed when a sample of the solid sorbent composition of this invention is analyzed by scanning electron microscopy (SEM) after at least 40 carbonation/decarbonation cycles, as compared with an SEM observation of a fresh as-synthesized sample of the composition.

The $CO_2$ adsorption capacity of the sorbent prepared by the synthesis method of this invention is generally greater than about 0.05 g $CO_2$/g sorbent. Preferably, in the instance wherein the $CO_2$-containing feed stream is a typical flue gas, the adsorption capacity is greater than about 0.35 g $CO_2$/g sorbent, and more preferably, greater than about 0.40 g $CO_2$/g sorbent. Moreover, when the sorbent is prepared by the more advantageous embodiment of this invention, the sorbent's $CO_2$ capacity unexpectedly increases with increasing cycle number and tends to remain steady through additional cycles.

EMBODIMENTS

Example 1

An embodiment of the solid sorbent composition of this invention was synthesized comprising calcium oxide, calcium aluminate, and lanthanum aluminate. The starting materials for the synthesis were acquired from Sigma-Aldrich and included: hydrated lime $Ca(OH)_2$, aluminum hydroxide $Al(OH)_3$, and hydrated lanthanum nitrate.

Figure 2:
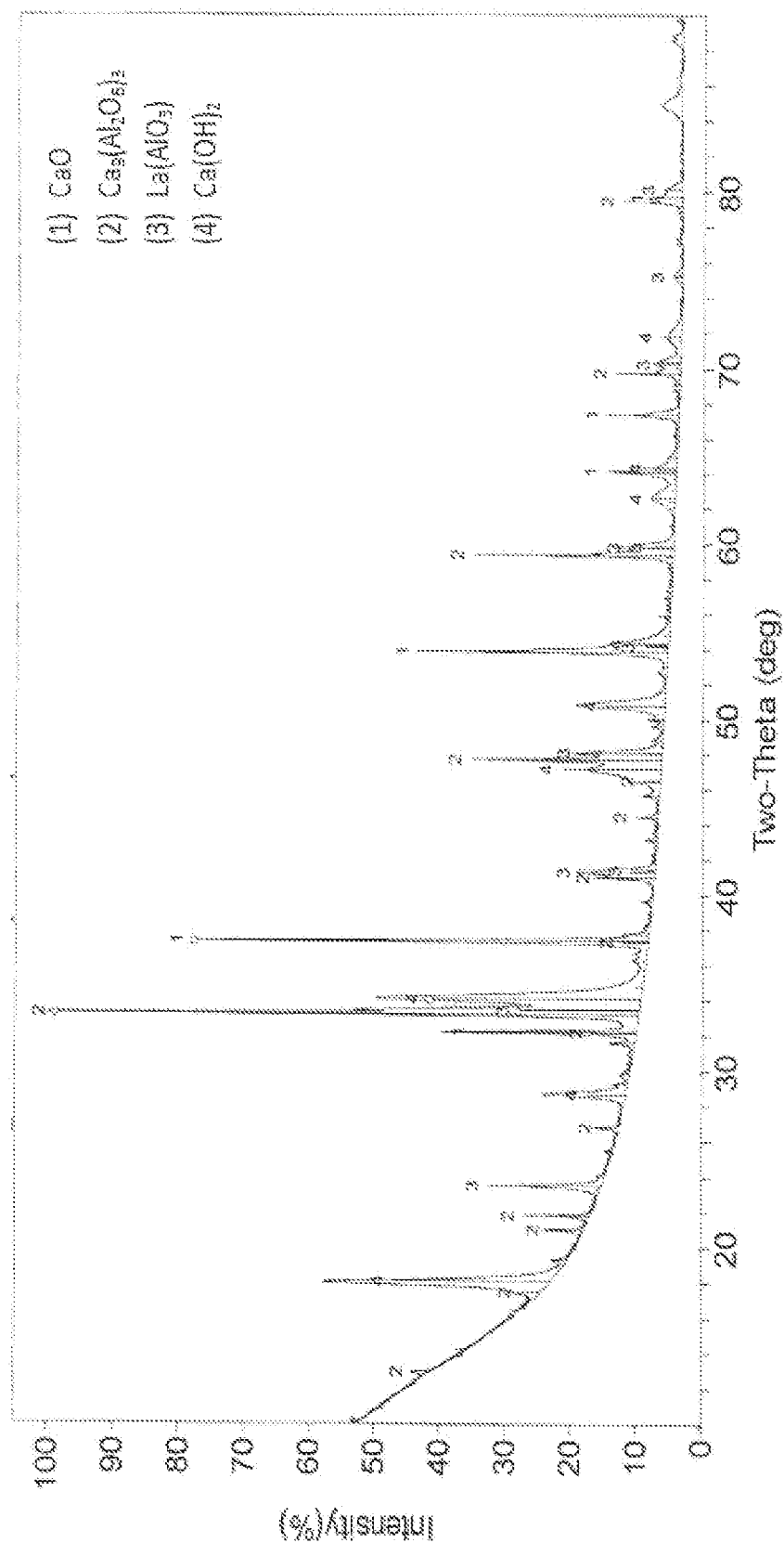
FIG. 2 illustrates an X-ray diffraction pattern (XRD) of an embodiment of an as-synthesized sorbent composition of this invention.

Hydrated lime (307.0 g), aluminum hydroxide (65.0 g), and hydrated lanthanum nitrate (68.5 g) were mixed with deionized water to form a slurry containing 20 percent solids by weight (excluding milling media). The slurry was milled at 60 RPM for 8 h in the presence of cylindrical ceramic milling media. The milling was conducted under air at room temperature and ambient pressure. Afterwards, the slurry was decanted to separate the milling media; and then the slurry was dried on a hot plate to evaporate the water. The resulting dried material was calcined under air at 1,100° C. for 3 h to yield a sample of the solid sorbent composition of this invention comprising 49.6 percent lime (CaO), 16.4 percent portlandite ($Ca(OH)_2$), 28.2 percent crystalline nonacalcium tris(dialuminate) of formula $Ca_9(Al_2O_6)_3$, and 5.8 percent lanthanum aluminate ($LaAlO_3$), as determined by XRD analysis (Panalytical X'pert diffractometer using Cu radiation). FIG. 2 presents the XRD pattern of the as-synthesized sample, which exemplifies an embodiment of the sorbent as prepared through step (b) of the method of making.

Example 2

The sorbent composition of Example 1 (50 g) was loaded into a quartz reactor in a fixed-bed configuration and placed in a tubular furnace. Then, the sorbent was subjected to a series of carbonation-decarbonation cycles under varying process conditions, in order to form the more advantageous sorbent embodiments of this invention. With reference to Table 1, carbonation cycles were performed at 650° C. under a stream comprising 15 volume percent carbon dioxide in air for cycles #11-13 and 15 volume percent carbon dioxide in nitrogen for all other cycles. Cycles noted as "wet" were run with the gas stream bubbled through deionized water at 21° C. and pH 7 prior to introduction into the reactor. Calcination cycles were conducted at 950° C. under air for cycles #11-13 and under nitrogen for all other cycles. Samples were weighed before and after the calcination cycle. The weight gain of the sorbent was recorded with the results shown in Table 1. Where the cycle is not reported in the table, no weighing was made.

TABLE 1

Sorbent of Example 1 under Carbonation-Decarbonation Cycles[1]

| Cycle | % of Theoretical Max Capacity | Sorbent Capacity, g $CO_2$/g sorbent | Notes |
|---|---|---|---|
| 1 | 56.6 | 0.30 | |
| 2 | 58.0 | 0.31 | |
| 3 | 52.8 | 0.28 | |
| 4 | 52.5 | 0.28 | |
| 5 | 52.5 | 0.28 | |
| 6 | 60.1 | 0.32 | |
| 7 | 60.4 | 0.32 | |
| 8 | 58.0 | 0.31 | |
| 9 | 56.6 | 0.30 | |
| 10 | 56.3 | 0.30 | |
| 11 | 59.8 | 0.32 | |
| 12 | 57.0 | 0.30 | |
| 13 | 56.6 | 0.30 | |
| 14 | 54.6 | 0.29 | |
| 15 | 53.9 | 0.28 | |
| 17 | 66.3 | 0.35 | In presence of water vapor |
| 18 | 67.0 | 0.36 | |
| 19 | 61.0 | 0.32 | |
| 20 | 64.2 | 0.34 | |
| 21 | 62.4 | 0.33 | |
| 22 | 76.7 | 0.41 | In presence of water vapor |
| 27 | 75.6 | 0.40 | In presence of water vapor |
| 28 | 76.7 | 0.41 | |
| 33 | 74.2 | 0.39 | In presence of water vapor |
| 34 | 71.7 | 0.38 | |
| 39 | 76.7 | 0.41 | In presence of water vapor |
| 40 | 91.7 | 0.49 | Sorbent re-milled |
| 41 | 88.8 | 0.47 | Pure $CO_2$ |
| 42 | 85.6 | 0.46 | |

[1]Breaks in numbering refer to cycles run through carbonation-decarbonation cycle(s), but not measured.

From Table 1 it is seen that the $CO_2$ sorption capacity of the composition of this invention increased over the duration of the cycles. Increased capacity was noted in carbonation cycles 17, 22, 27, 33, and 39, made in the presence of water vapour; and significantly the increased sorbent capacity was maintained after the water vapour was removed. Specifically, in cycles 22-39, wherein the sorbent was prepared in accordance with the advantageous embodiment of this invention, the sorbent capacity was significantly increased to 0.41 g $CO_2$/g sorbent (9 moles $CO_2$/kg sorbent) at cycle 22. To clarify, material formed after at least two consecutive water-containing "wet" carbonation and dry decarbonation calcining cycles comprises the advantageous embodiment of this invention, corresponding to that sorbent formed after cycle 23. Note that cycles 23-26 were "wet", although data were not collected for these.

FIG. 3 presents a graph plotting percent of theoretical maximum carbon dioxide sorption capacity for the composition of Example 1 as determined for the above-described carbonation-decarbonation cycles. Notably, cycles 22 through 39 illustrate how synthesizing the sorbent in the presence of water vapor and decarbonation over two or more cycles significantly improved performance.

FIG. 4 presents an XRD pattern of the solid sorbent composition of Example 1 after cycling through 15 carbonation-decarbonation cycles per Example 2, ending on a decarbonation cycle. The XRD pattern identified the presence of portlandite ($Ca(OH)_2$), lime (CaO), nonacalcium tris(dialuminate) $Ca_9(Al_2O_6)_3$, mayenite $Ca_{12}Al_{14}O_{33}$, and lanthanum aluminate ($LaAlO_3$).

The composition of the invention was imaged using scanning electron microscopy (SEM) first as freshly synthesized in accordance with Example 1 and again after 15 carbonation-decarbonation cycles as obtained per Example 2. The sample that was put through the cycles showed no significant change in morphology as compared with the fresh as-synthesized sample.

FIG. 5 presents an XRD pattern the solid sorbent composition of this invention after cycling through 42 carbonation and decarbonation cycles per Example 2, ending on a carbonation cycle. The XRD pattern identified the presence of lime (CaO), portlandite ($Ca(OH)_2$), calcite ($CaCO_3$), nonacalcium tris(dialuminate) ($Ca_9(Al_2O_6)_3$), and lanthanum aluminate ($LaAlO_3$).

Comparative Experiment 1

For comparative purposes a series of carbonation-decarbonation experiments was run using calcium oxide as the sorbent. A fixed bed reactor similar to the one used in Example 2 was packed with calcium oxide. Carbonation cycles were conducted at 650° C. under a stream comprising 15 volume percent carbon dioxide in nitrogen. Cycles #16 through #20 noted as "wet" were run with the gas stream bubbled through deionized water at 21° C. and pH 7 prior to introduction into the reactor. Calcination cycles were conducted at 950° C. under air for cycles #11-13 and under nitrogen for all of other cycles. The carbonation experiments were stopped when the sorbent capacity of the CaO dropped to less than 20 percent of the initial value measured in cycle #1.

Table 2 illustrates $CO_2$ sorbent capacity over 21 carbonation cycles for calcium oxide. Where the cycle is not reported in the table, no weighing was made.

TABLE 2

CaO Carbonation/Decarbonation Cycles[1]

| Cycle | % of Theoretical Max Capacity | Sorbent Capacity, g $CO_2$/g sorbent | Notes |
|---|---|---|---|
| Start | 100.0 | 0.78 | |
| 1 | 69.5 | 0.54 | |
| 2 | 63.3 | 0.49 | |
| 3 | 56.0 | 0.44 | |
| 4 | 47.0 | 0.36 | |
| 5 | 43.6 | 0.34 | |
| 10 | 31.9 | 0.25 | |
| 15 | 19.9 | 0.15 | |
| 16 | 28.5 | 0.22 | In presence of water vapor |
| 21 | 19.2 | 0.15 | |

[1]Breaks in numbering refer to cycles run through carbonation-decarbonation cycle(s), but not measured.

From Table 2 it is seen that the sorbent capacity of CaO continuously dropped without the presence of water. With water, the capacity increases but drops significantly thereafter. FIG. 3 presents a graph plotting percent of theoretical maximum carbon dioxide sorption capacity for calcium oxide tested in this experiment, as compared with the sorbent of the invention illustrated in Example 2.

When Example 2 was compared with Comparative Experiment 1, it was seen that the solid sorbent composition of this invention provided a higher level of $CO_2$ uptake over a greater number of carbonation-decarbonation cycles, as compared with using calcium oxide alone as the sorbent.

Comparative Experiment 2

FIG. 6 presents a graph of carbon dioxide capture over 10 carbonation-decarbonation cycles for the solid sorbent composition of this invention, as prepared and tested in Examples 1 and 2 hereinabove. These data are compared with carbon dioxide capture over a similar number of cycles for calcium oxide-aluminate sorbents disclosed in the prior art (S. Wu, et al., Ind. Eng. Chem. Res., 49, 2010, 12269). The prior art sorbents, in particular, did not include a mixed metal oxide characterized by a perovskite crystalline structure, such as, lanthanum aluminate. The composition of the invention was prepared by calcination at 1,100° C., which is somewhat higher than the calcination temperature of the prior art; but the different calcination temperatures both result in formation of calcium oxide.

It was found that the solid sorbent of this invention comprising calcium oxide, calcium aluminate, and lanthanum aluminate provided a higher sorbent capacity, as compared to prior art sorbents consisting of calcium oxide and alumina binder.

Example 3

The composition of Example 1, comprising 49.6 percent lime (CaO), 16.4 percent portlandite ($Ca(OH)_2$), 28.2 percent crystalline nonacalcium tris(dialuminate) of formula $Ca_9(Al_2O_6)_3$, and 5.8 percent lanthanum aluminate ($LaAlO_3$) by weight, was mixed with an alumina binder. The resulting solid mixture comprised 90 percent composition of Example 1 and 10 percent alumina binder by weight. Sufficient water was added to form a paste that was aged at room temperature for 24 hours. Then, the paste was extruded through an opening of 0.1 inch diameter (2.5 mm) and cut into extrudate pellets ranging from 0.2 to 0.3 inch (5.1-7.6 mm) in length. The pellets were dried in air for 1 hour, then treated in a $CO_2$ atmosphere (100 vol. %) by heating to 100° C. at a rate of 1°/min; then held at 100° C. for 1 hour, then heated to 1,000° C. at a rate of 5°/min, then held at 1,000° C. for 1 hour. The pellets were thereafter heat treated at 900° C. under nitrogen (100 vol. %) for 3 hours to completely desorb adsorbed $CO_2$ yielding a composition of this invention (1.826 g).

The composition thusly prepared was exposed to alternating carbonation and decarbonation cycles as follows: first under a flow of nitrogen (199 standard cubic meters per minute (SCCM)) mixed with carbon dioxide (1 SCCM) for 3 hours to determine the adsorption capacity for $CO_2$ at 100° C., 200° C., and 400° C.; and second under a flow of nitrogen (199 SCCM) alone at 900° C. for 3 hours to desorb $CO_2$. Samples were weighed before and after each decarbonation cycle to give the sorbent capacities shown in Table 3.

TABLE 3

| | CO$_2$ Adsorption Capacity of Example 3 | |
|---|---|---|
| Temperature | Exposure | CO$_2$ Captured Within 1 Hour (g CO$_2$/g sorbent) |
| 100° C. | 0.5 vol. % CO$_2$ in N$_2$ | 0.067 |
| 200° C. | 0.5 vol. % CO$_2$ in N$_2$ | 0.062 |
| 400° C. | 0.5 vol. % CO$_2$ in N$_2$ | 0.120 |

The results in Table 3 show that the composition of this invention is effective in removing carbon dioxide from a gaseous stream containing only 0.5 volume percent $CO_2$.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

The invention claimed is:

1. A sorbent composition comprising calcium oxide, calcium aluminate, and lanthanum aluminate characterized by a perovskite crystalline structure, the sorbent composition being prepared by a process comprising:
   (a) preparing a mixture of calcium oxide or a precursor thereof, calcium aluminate or a precursor thereof, and lanthanum aluminate having a perovskite crystalline structure or a precursor thereof;
   (b) calcining the mixture under a dry gas to form a first calcined material;
   (c) contacting the first calcined material with carbon dioxide in the presence of water vapor at a first temperature sufficient to form an at least partially carbon dioxide-saturated material;
   (d) decarbonating the at least partially carbon dioxide-saturated material at a second temperature sufficient to remove the carbon dioxide and form a second calcined material;
   (e) cooling the second calcined material to the first temperature; and
   (f) repeating steps (c) through (e) at least once so as to yield the sorbent composition.

2. The sorbent composition of claim 1 comprising from greater than 18 percent to less than 90 percent by weight calcium oxide (dried basis), based on the total weight of the sorbent composition.

3. The sorbent composition of claim 1 comprising from greater than 5 percent to less than 80 percent by weight calcium aluminate, based on the total weight of the sorbent composition.

4. The sorbent composition of claim 1 comprising from greater than 2 percent to less than 20 percent by weight mixed lanthanum aluminate, based on the total weight of the sorbent composition.

5. The sorbent composition of claim 1 wherein the calcium aluminate is selected from the group consisting of crystalline compounds of molecular formula $Ca_9(Al_2O_6)_3$, $CaAl_4O_7$, $CaAl_2O_4$, and $Ca_{12}Al_{14}O_{32}Y$, wherein Y is selected from the group consisting of $O^{2-}$, $N^{2-}$, $(OH^-)_2$, $(F^-)_2$, $(Cl^-)_2$, $(H_2O)_4(Cl^-)_2$, $(H_2O)_4(F^-)_2$, and $(e^-)_2$ where $e^-$ represents a free electron, and mixtures of the aforementioned crystalline structures.

6. The sorbent composition of claim 1 wherein the calcium aluminate comprises a mixture of $Ca_9(Al_2O_6)_3$ and $Ca_{12}Al_{14}O_{33}$.

7. The sorbent composition of claim 1 wherein the mixture of step (a) is prepared in a slurry containing from 10 to 50 percent solids, further comprising a liquid diluent selected from the group consisting of water, $C_{1-4}$ alcohols, and mixtures thereof.

8. The sorbent composition of claim 1 wherein the first calcination of step (b) is conducted under a dry gas containing less than 1 volume percent water vapor at a temperature greater than 800° C. but less than 1,400° C.

9. The sorbent composition of claim 1 wherein the carbonation step (c) is conducted at a temperature greater than 500° C. and less than 750° C., and optionally wherein the sorbent is exposed to a carbon-dioxide-containing stream comprising from 1 to 25 percent water vapor by volume.

10. The sorbent composition of claim 1 wherein the decarbonation step (d) is conducted at a temperature greater than about 850° C. and less than about 1,100° C. and under a dry sweep gas containing less than 1 volume percent water.

11. A method of preparing a sorbent composition comprising calcium oxide, calcium aluminate and lanthanum aluminate having a perovskite crystalline structure, the method comprising:
(a) preparing a mixture comprising calcium oxide or a precursor thereof, calcium aluminate or a precursor thereof, and lanthanum aluminate having a perovskite crystalline structure or a precursor thereof;
(b) calcining the mixture under a dry gas to form a first calcined material;
(c) contacting the first calcined material with carbon dioxide in the presence of water vapor at a first temperature sufficient to form an at least partially carbon dioxide-saturated material;
(d) decarbonating the at least partially carbon dioxide-saturated material at a second temperature sufficient to remove the carbon dioxide and form a second calcined material;
(e) cooling the second calcined material to the first temperature; and
(f) repeating steps (c) through (e) at least once so as to yield the sorbent composition.

12. The method of claim 11 wherein the precursor to calcium oxide is calcium hydroxide, calcium carbonate, calcium nitrate, or a mixture thereof.

13. The method of claim 11 wherein the precursor to calcium aluminate is a mixture comprising calcium oxide (anhyrous or hydrated) and alumina, or hydrotalcite of molecular formula $CaAl_2(CO_3)_2(OH)_4 \cdot 3H_2O$, or hydrocalumite of molecular formula $Ca_4Al_2(OH)_{12}(Cl, OH)_2 \cdot 4H_2O$ or formula $Ca_4Al_2(OH)_{12}(CO_3) \cdot 4H_2O$, or any mixture of the aforementioned materials.

14. The method of claim 11 wherein the precursor to the lanthanum aluminate having the perovskite structure is a mixture of lanthanum nitrate and alumina.

15. The method of claim 11 wherein the mixture of step (a) is prepared in a slurry containing from 10 to 50 percent solids in a liquid diluent selected from the group consisting of water, $C_{1-4}$ alcohols, and mixtures thereof.

16. The method of claim 11 wherein the first calcination of step (b) is conducted under a dry gas containing less than 1 volume percent water vapor and at a temperature greater than 800° C. but less than 1,400° C.

17. The method of claim 11 wherein the carbonation step (c) is conducted at a temperature greater than 500° C. and less than 750° C. in a carbon-dioxide stream containing from 1 to 25 percent water vapor by volume.

18. The method of claim 11 wherein the decarbonation step (d) is conducted at a temperature greater than about 850° C. and less than about 1,100° C. under a dry gas containing less than 1 volume percent water vapor.

19. A process of capturing carbon dioxide from a carbon dioxide-containing gaseous stream comprising contacting a gaseous feed stream comprising carbon dioxide with the solid sorbent composition of claim 1; the contacting occurring under carbonation process conditions sufficient to produce a solid mixture comprising calcium carbonate and a gaseous product stream comprising a reduced concentration of carbon dioxide, as compared with an initial concentration of carbon dioxide of the gaseous feed stream.

20. A reversible process of capturing and recovering carbon dioxide from a carbon dioxide-containing gaseous stream, comprising:
(a) in a carbonation reactor, contacting a gaseous feed stream comprising carbon dioxide with the sorbent composition of claim 1; the contacting occurring under carbonation process conditions sufficient to produce a solid mixture comprising calcium carbonate and a gaseous product stream comprising a reduced concentration of carbon dioxide as compared with an initial carbon dioxide concentration of the gaseous feed stream; and
(b) in a calcination reactor, heating the solid mixture comprising calcium carbonate under decarbonation process conditions sufficient to regenerate the solid sorbent composition of claim 1, thereby producing a gaseous stream enriched in carbon dioxide.

* * * * *